United States Patent [19]

Miles, deceased et al.

[11] Patent Number: 4,877,318
[45] Date of Patent: Oct. 31, 1989

[54] ULTRA-SHORT OPTICAL SYSTEM FOR BINOCULARS

[76] Inventors: John R. Miles, deceased, late of Glenview; by Mildred L. Miles, heir, 830 N. Glenayre Dr., Glenview, both of Ill. 60025; Grant Miles, 2121 W. Cuyler Ave., Chicago, Ill. 60618

[21] Appl. No.: 643,180

[22] Filed: Aug. 22, 1984

Related U.S. Application Data

[63] Continuation-in-part of Ser. No. 344,062, Jan. 29, 1982, Pat. No. 4,488,790.

[51] Int. Cl.$^4$ ............... G02B 23/02; G02B 27/40
[52] U.S. Cl. ................................ 350/569; 350/571
[58] Field of Search ............... 350/569, 571, 478, 481

[56] References Cited

U.S. PATENT DOCUMENTS

| | | | |
|---|---|---|---|
| 415,040 | 11/1889 | Hastings | 350/481 |
| 2,424,283 | 7/1947 | Miles | 350/478 |
| 3,051,050 | 8/1962 | Kohler | 350/478 |
| 3,655,260 | 4/1972 | Bartucci et al. | 350/571 |
| 4,488,790 | 12/1984 | Beecher | 350/549 |

Primary Examiner—William H. Punter

[57] ABSTRACT

An ultra-short and novel optical system, designed for the binocular described in U.S. Pat. No. 4,488,790, granted Dec. 18, 1984, having an air-spaced objective that is as short as is physically possible and an Erfle type eyepiece that is also as short as is physically possible, to produce a magnification of 7 power in a binocular with an objective 30 mm in diameter and an eyepiece with a real angle of 9°. A feature of this optical system is the employment of oval mirrors of four different sizes, arranged so that the end mirrors are virtually touching the adjacent lens elements of the objective and eyepiece. Another feature is that the focal plane is curved rather than flat as in conventional binoculars. A further feature is that the first and last achromats of the eyepiece are tilted very slightly at the top in the direction of the objective to elongate the apparent depth of focus by arraying sharp focus along a gradient in the field of view from top (distant) to bottom (near). A final novel feature is the use of "velvet" lining on the inner walls of the tubes exactly enclosing the optical system to absorb off-axis stray light and eliminate glare.

12 Claims, 1 Drawing Sheet

U.S. Patent
Oct. 31, 1989
4,877,318
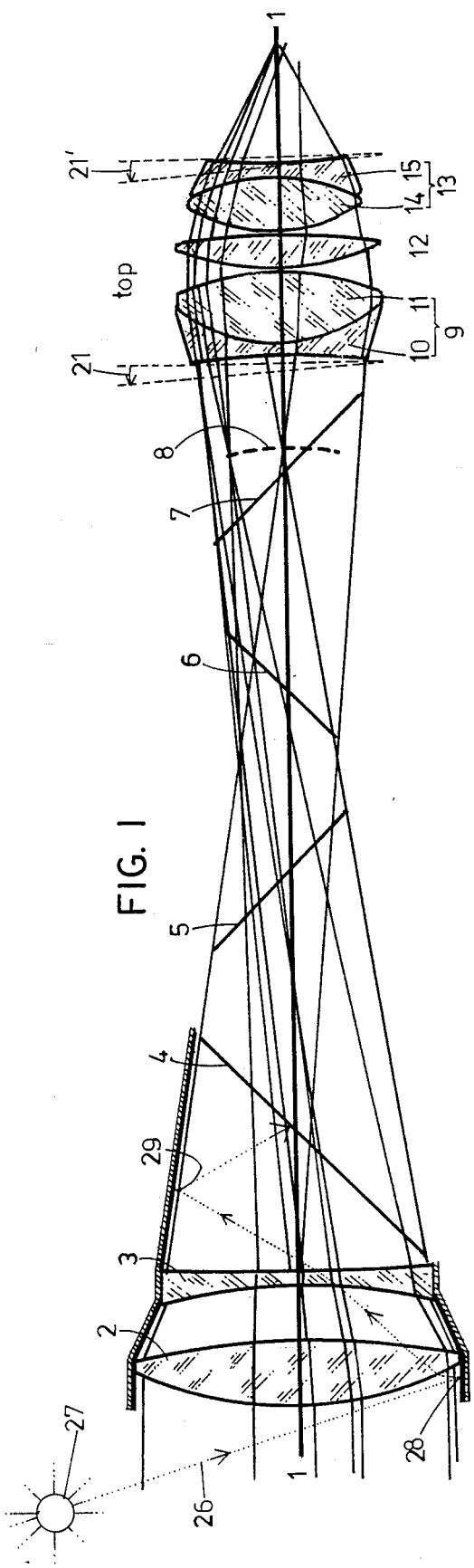
FIG. 1
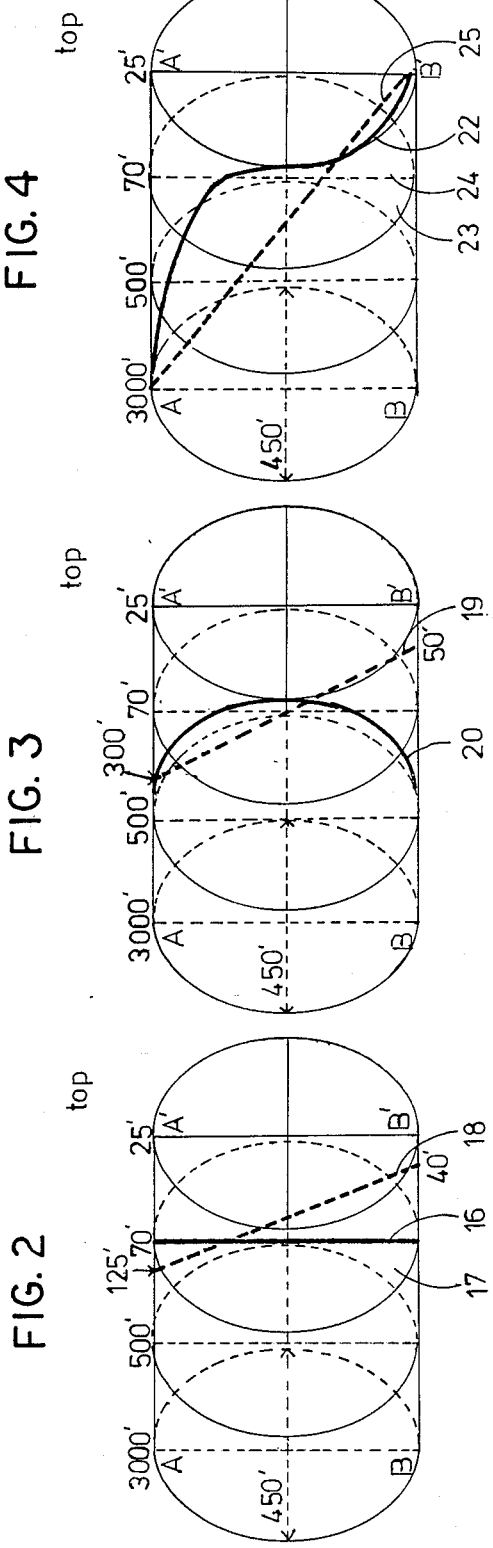
FIG. 2
FIG. 3
FIG. 4

ULTRA-SHORT OPTICAL SYSTEM FOR BINOCULARS

This application is a continuation-in-part of application Ser. No. 344,062 filed Jan. 29, 1982, now U.S. Pat. No. 4,488,790, granted Dec. 18, 1984, and relates to the extremely short focal length optical dystem designed for the very short binocular of that invention.

The object of the present invention is to provide an air-spaced, ultra-short objective of 94.82 mm, capable of producing an image comparable with that of a standard 7×35 binocular in its control of coma and spherical and chromatic aberrations, together with an erector system of 4 very thin mirrors of 98 to 99% reflectivity, arranged in Porro one fashion, and a 9° Erfle type eyepiece with the ultra-short focal length of 13.54 mm focal length, in which the highly convex elements are virtually touching each other, to produce a magnification of 7 power. All glass to air lens surfaces are multi-coated to reduce light loss to ½% at each surface, to the end that the brightness of the image of this 7×30 mirror binocular be comparable to that of the conventional 7×35 prism binocular.

The air-spaced objective was originally conceived by the petitioners not only for superior control of aberrations and coma in so short a focallength, but because the smaller diameter of the negative lens eliminated the weight of the thicker peripheral glass. Glass was also trimmed from the first and last eyepiece achromats to produce cone-shaped lenses exactly conforming to the light rays. Here the object was not merely to reduce the weight of unnecessary glass but to permit the thin-walled eyepiece barrel to present an outwardly-diverging, thin-walled cone to the viewing eye to promote the "disappearance" of the binocular before the eyes of the viewer. Beecher first retained the professional services of the late John R. Miles to compute the optical system, which was later optimized to make use of more readily-available optical glasses falling within the "20 percent rule" by his son Grant Miles of Karl Lambrecht Corporation, who is co-inventor of the present optical system.

The novel features of this invention will now be detailed, following a brief description of the figures:

FIG. 1 is a stretched-out diagram of the optical system, showing the lens elements of the objective and the eyepiece, with the mirrors between indicated only by diagonal lines. A hatched section at the objective end, outside the lines indicating the ray traces of the optical system, identifies the wall of the enclosing tube diagrammatically and the heavy black line indicates the anti-glare "velvet" lining to be discussed below.

FIGS. 2, 3 and 4 require preliminary discussion. They have the purpose of comparing in graph form the shape of the focal plane of the objective as viewed by the eyepiece, as well as the depth of focus, in a conventional binocular (FIG. 2) and the Beecher binocular (FIGS. 3 and 4). All three figures depict a transparent tube and, since the field of view of the two compared binoculars is 150 yards at 1000 yards distance, the cross section of the tube is represented as 450' (150 yards) and the length of the tube is 3000' (1000 yards). Inside the tube is drawn a vertical plane AA'B'B on which is graphed (in heavy solid line) the shape of the focal plane and (in heavy dashed line) the effective depth of focus. The latter dashed line shows actual objects found to be in focus along the scale (25' to 3000') drawn at the top of the vertical plane when each binocular is focused at 70' in the center of the field.

FIG. 1 is a diagram of the optical system of this invention in unfolded, longitudinal section with mirrors simply indicated by lines drawn at 45° to the optical axis (1). Radii, glass types, thickness and precise positions of both lenses and mirrors are recited below.

The first element of the objective 2 is a double convex crown glass, SK16, 30 mm in diameter, 1.0 mm thick on the edge and 5.65 mm thick in the center, with the first radius 34.7410 mm and the second radius −79.6844 mm. The second surface of the first element is separated by 5.48 mm from the first surface of the second lens 3, which is a double concave flint element of SF1 glass 25.4 mm in diameter, with the first radius −47.5533 mm and the second radius 223.2772 mm. The diameter of the negative element of this objective is only five-sixths that of the positive element and the focal length of the whole objective is less than 3.2 times the useable diameter of its largest element (30 mm).

The distance to the first mirror 4 from the second surface of the second lens of the objective 3 along the optical axis 1 is 13.4 mm. The distance from the first mirror to the second mirror 5 is 23.0 mm. The distance from the second mirror to the third mirror 6 is 83.4 mm. The distance from the third mirror to the fourth mirror 7 is 19.5 mm. The distance from the fourth mirror to the focal plane of the objective 8 is 2.0 mm, and from the focal plane to the first surface of the first achromat 9 of the eyepiece is 9.8 mm.

The first element of the eyepiece 10 is a double concave flint element of SF8 glass 19.0 mm in diameter, 4.8 mm thick on the edge and 0.96 mm thick in the center, with the first radius −76.3510 mm and the second radius, 14.4100 mm. It is cemented to the second crown element 11 of LaK21 rare earth glass of the same diameter, which is 1.0 mm thick on the edge and 7.3 mm thick in the center and has a second surface radius of −20.3100 mm. The second double convex crown element 12 is spaced 0.1 mm from the first. It is an FK5 fluor crown glass 19 mm in diameter with the first radius 23.9800 mm and the second surface −60.6500 mm, 0.5 mm thick on the edge and 3.1 mm thick in the center. This element is separated by 0.1 mm from the first surface of the fourth element, which is part of an achromat 13 which is 15.6 mm in diameter. The first element 14 of this doublet is a double convex rare earth crown element of LaK21 glass, 1.0 mm thick on the edge and 5.1 mm thick in the center. The first radius is 15.8590 mm and the second radius is −14.9570 mm. It is cemented to a double concave flint element 15 of SF7 glass of the same diameter, which is 3.6 mm thick on the edge and 0.8 mm thick in the center. The second radius is 26.5470 mm. Note that the first (9) and last (13) doublets or achromats are tapered to follow exactly the ray traces and are thus coneshaped lenses. All elements are thin as feasible. Since the edges of convex lenses, the centers of concave lenses and the mirrors do not exceed 1 mm in thickness, the lenses are mirrors described above weigh only 30 grams.

It was stated above that the optical system focal length was the shortest physically possible for an objective 30 mm in diameter and a real eyepiece angle of 9°. Reference here is made to the distance required for the image to get through all four mirrors in order to be turned right side up and corrected right to left. The mirrors are as close to each other as they can be without cutting off the optical path when it is folded in the actual binocular, and the focal plane is just 2.0 mm beyond the fourth mirror, making the focal length of the objective as short as possible. Of course, in order to achieve a power of 7 times, the focal length of the eyepiece must be divided into the 94.82 mm focal length of the objective; it must be equally short. Again, the focal length of the eyepiece, just 13.54 mm, seems to be as short as is physically possible. The achromats are of extreme light-bending power with the radii of the rare earth positive elements highly convex and the radii of the positive fluor crown element sandwiched between them are also extreme. Since the achromats are within 0.1 mm of touching the central element on each of its surfaces, it is obvious that the eyepiece, which is already shorter (13.54 mm) than it is wide (19 mm), could hardly be any shorter in focal length. In fact, the eyepiece, measured across the rims of the outer elements, is shorter than the diameter of its largest lens.

In this optical system the air-shaped crown element 2 and the flint element 3 of the objective control most of the spherical aberration and coma, the exact spacing between them being critical to 0.002". The lenses of the eyepiece correct the objective's axial and marginal rays one by one along a focal plane 8 which is parabolic rather than flat as in conventional binoculars. To collect the widely-diverging outer rays of an objective having an extremely short focal length of only 94.82 mm (⅔ that of most 7×35 binoculars), the first achromat 9 of the eyepiece is highly refractive and is directed strongly forward to collect these rays and conduct them to the eyepoint, as in John R. Miles' original optical system for a very large and heavy 7×50 binocular (U.S. Pat. No. 2,424,283), matching its field curvature to that of the objective. The second or middle element, the highly refractive lens 12, is equally bent rearward, conducting the rays to the second achromat 13, which funnels them to the eyepoint.

FIGS. 2, 3 and 4 illustrate an important difference in the performance of the optical system of the Beecher 7×30 mirror binocular when compared with that of the Leitz Trinovid 7×35 prism binocular, generally considered to be the best binocular available. The Leitz binocular optical system is designed with a flat field and its focal plane 16 (FIG. 2), when it is focused on an object 70 feet distant, centered in its viewing field 17 (FIG. 2) is flat, as indicated by the straight, dark line. The field is not flat to the edge, however, and looking off-axis at objects in the edge, both closer and farther away than 70', makes it apparent that the field is not curved at the edge. It is simply very difficult to correct a flat field to the edge. The depth of focus of this binocular, indicated by the dashed line 18, is only from 40 feet to 125 feet when the binocular is focused on 70 feet.

The Miles-Beecher optical system, diagrammed in FIG. 3, is corrected to the edge of the field but not on a flat plane. In viewing an object focused at the same 70 feet away, the focus is found to be sharp from the center to a point more than half way to the edge. At this point the focus shifts imperceptibly and is sharp on objects 300 feet away. The near point of sharp focus at the 70 foot setting is 50 feet, not as good as the Leitz, which was 40 feet, but the total depth (dotted line 19), 250 feet in the Beecher, is superior to the total depth of the Leitz at 85 feet. The focal plane of the Beecher is found to be a parabola (solid line 20).

The peculiar character of the Beecher binocular, with objects coming into focus all along the parabolic focal plane, as viewed in concentric zones off axis in the binocular field while moving outward toward the rim from the center, lends this optical system to a novel manipulation enabling us to increase the depth of focus, particularly at the near end. FIG. 4 shows the optical system of the Beecher binocular when the first 9 and last 13 achromats of the eyepiece in FIG. 1 are both tilted forward at the top about 0.005" in the direction of the objective. This is the equivalent of tilting them on the optical axis 1(FIG. 1) 18 or 20 minutes of arc (21 and 21') but not more than 30. The result (FIG. 4) is to stretch the parabolic curve of the focal plane seen in FIG. 3 (20) into the sigmoidal curve 22 of FIG. 4. The original parabolic curve has been extended forward to 3000 feet at the top and backward to 25 feet at the bottom of the viewing field 23 with the center of the field focused at 70 feet (24), and the effective depth of focus (heavy dotted line 25) is increased to range from 25 feet to 3000 feet along this sigmoidal curve 22, which represents actual objects coming into focus at the levels and distances indicated on the vertical plane defined by AA'B'B. To the user of the binocular there is a gradient of focus in the viewing field, with objects 3000 feet distant coming in sharp at the top and objects 25 feet away coming in sharp at the bottom. The explanation of the stretching of the parabolic curve at the top of the viewing field to extend sharp focus out to 3000 feet is that tilting the eyepiece achromats slightly toward the objective at the top shortens the outer rays entering the lower edge of the objective and lengthens those entering the top edge. The increase in near focus at the bottom of the viewing field in a sigmoidal curve is characteristic of the scheimpflug condition, the principle employed in the swings and tilts of bellows cameras since the nineteenth century to bring all parts of a scene into focus.

The tilting of the lenses in just this way is done because it is natural to have distant objects sharp in the top of the viewing field and close objects sharp in the bottom. It is the way landscapes are laid out and works equally well when looking at a tall tree, for the base and top will be in focus when the user focuses an intermediate point on the trunk in the center of the field.

Finally, off-axis light is a problem in a binocular whose body shell exactly fits the light bundle of the optical system. FIG. 1 shows how a stray beam 26 from the sun at a high angle 27 may reflect off the inside of the objective tube that extends beyond the lens 28, to be transmitted through objective elements 2 and 3 to cause glare. This may be controlled by lining the objective tube with a black flocked surface of short (0.005") rayon or other fibres electrostatically or airblown on the freshly-painted surface—or a velvet black paint may be used. In the Beecher application it is illustrated as a heavy black line at 28 and 29 in FIG. 1.

Mirrors are used in the Miles-Beecher optical system, not only because they are lighter in weight and, by permitting their tailoring to the exact shape of the light path, permit designing an objective of shorter focal length, but because they are thought to be optically superior to prisms. Even the 1 mm thick mirrors used in the Beecher binocular may be ground and polished to a flatness of ½ wavelength of light, resulting in needle-sharp resolution of the viewed image. The enhanced silver coating applied to these super-flat mirror substrates results in more efficient transmission of light than in prisms, since the mirror coating is as high as 99% reflective.

Having thus described the Invention, what we claim as new and desire to secure by Letters Patent is:

1. An optical system for binoculars and telescopes having an air-spaced objective of extremely short focal length, a plurality of four ultra-thin, highly-reflective, lightweight, oval mirrors of varying size and a 9° Erfle type, 5 element eyepiece of extremely short focal length in which the first element of the objective is a double convex crown glass, SK16, 30 mm in diameter and 1.0 mm thick on the edge and 5.65 mm thick in the center, with the first radius 34.7410 mm and the second radius, −79.6844 mm; the second surface of the first element is separated by 5.48 mm from the first surface of the second lens, which is a double concave flint element of SF1 glass 25.4 mm in diameter, with the first radius −47.5333 mm and the second radius 223.2772 mm; the distance to the first mirror from the second surface of the second lens along the optical axis is 13.4 mm; the distance from the first mirror to the second is 23.0 mm; the distance from the second mirror to the third is 83.4 mm; the distance from the third mirror to the fourth is 19.5 mm; the distance from the fourth mirror to the focal plane of the objective is 2.0 mm and from the focal plane to the first surface of the first achroat of the eyepiece is 9.8 mm; the first element of the eyepiece is a double concave flint element of SF8 glass 19.0 mm in diameter, 4.8 mm thick on the edge and 0.96 mm in the center, with the first radius −76.3510 mm and the second radius 14.4100 mm and is cemented to the second crown element of LaK21 rare earth glass of the same diameter, which is 1.0 mm thick on the edge and 7.3 mm thick in the center and has a second surface radius of −20.3100 mm; the second double convex crown element is spaced 0.1 mm from the first and is an FK5 fluor crown glass 19 mm in diameter with the first radius 23.9800 mm and the second radius −60.6500 mm, 0.5 mm thick on the edge and 3.1 mm thick in the center and is separated by 0.1 mm from the first surface of the fourth element which is part of an achromat 15.6 mm in diameter; the first element of this doublet is a double convex crown element of LaK21 rare earth glass, 1.0 mm thick on the edge and 5.1 mm thick in the center, in which the first radius is 15.8590 mm and the second radius is −14.9570 mm and this element is cemented to a double concave flint element of SF7 glass of the same diameter, which is 3.6 mm thick on the edge and 0.8 mm thick in the center, the second radius being 26.5470 mm; the first and last doublets of the eyepiece are tapered to follow exactly the light rays and are thus cone-shaped lenses.

2. An optical system for binoculars and telescopes as described in claim 1 and in which all the lenses and mirrors for one telescope of the binocular are extremely thin and weigh no more than 30 grams total.

3. An optical system for binoculars and telescopes as described in claim 1 and in which the focal length of 94.82 mm for the objective makes it the shortest ever designed for an objective 30 mm in diameter and an eyepiece of 13.54 mm focal length with a 9° real angle, having a total magnification for the entire optical system of 7 times.

4. An optical system for binoculars and telescopes as described in claim 1 and in which the focal length of 13.54 mm with a real angle of 9° for the eyepiece with a positive fluor crown lens of high convexity sandwiched between doublets having the rare earth positive elements of high convexity, all positive elements having the maximum of refractive power, is the shortest yet designed for a binocular with an objective of 94.82 mm focal length and a diameter of 30 mm.

5. An optical system as described in claim 1 and in which the eyepiece, when properly assembled, has a physical length, measured across the rims of the outer elements, that is shorter than the diameter of its largest lens.

6. An optical system as described in claim 1 and in which the focal plane of the objective is curved or parabolic, rather than flat as in conventional binoculars.

7. An optical system as described in claim 1 and in which the front and rear achromats of the eyepiece are tilted on the optical axis at the top in the direction of the objective 0.005″ or about 18 minutes of arc but not more than 30 minutes of arc to elongate the apparent depth of focus by arraying sharp focus along a gradient in the field of view from top (distant) to bottom (near), the parabola of the objective focal plane of claim 6 becoming sigmoidal.

8. An optical system as described in claim 1 and in which the focal length of the objective is less than 3.2 times the useable diameter the largest element thereof.

9. An optical system as described in claim 1 and in which the diameter of the negative element of the objective is only five/sixths that of the positive element.

10. An optical system as described in claim 1 and in which the mirrors are not more than 1.0 mm thick and are polished to a flatness of ¼ wavelength of light.

11. An optical system as described in claim 1 and in which the mirrors are 98–99% reflective.

12. An optical system as described in claim 1 and in which the inside of the closely-fitting tube containing the light path is painted with velvet black or flocked electrostatically or by airblowing with short (0.005″) black fibers of rayon, nylon or polyester to control glare of off-axis stray light beams.

* * * * *

UNITED STATES PATENT AND TRADEMARK OFFICE
CERTIFICATE OF CORRECTION

PATENT NO.   :   4,877,318
DATED        :   October 31, 1989
INVENTOR(S)  :   John R. Miles et al It is certified that error appears in the above-identified patent and that said Letters Patent is hereby corrected as shown below:

On the title page inventors' should read

--(76) Inventors: John R. Miles, Glenview, IL, Deceased; By Mildred L. Miles, Glenview IL, Heiress; Grant Miles, Chicago, IL; William J. Beecher, Chicago, IL. --.

Signed and Sealed this

Twenty-second Day of May, 1990

Attest:

HARRY F. MANBECK, JR.

*Attesting Officer*    *Commissioner of Patents and Trademarks*